United States Patent [19]

Bertsch-Frank et al.

[11] Patent Number: 5,094,827

[45] Date of Patent: * Mar. 10, 1992

[54] HIGH ACTIVE OXYGEN CONTENT GRANULATED SODIUM PERBORATE PRODUCT AND METHOD OF MAKING THE SAME

[75] Inventors: Birgit Bertsch-Frank; Klaus Mueller; Thomas Lieser, all of Hanau, Fed. Rep. of Germany

[73] Assignee: Degussa Aktiengesellschaft, Frankfurt am Main, Fed. Rep. of Germany

[*] Notice: The portion of the term of this patent subsequent to Nov. 6, 2007 has been disclaimed.

[21] Appl. No.: 570,267

[22] Filed: Aug. 20, 1990

Related U.S. Application Data

[63] Continuation-in-part of Ser. No. 355,845, May 17, 1989, Pat. No. 4,968,500, which is a continuation of Ser. No. 202,363, Jun. 6, 1988, abandoned.

Foreign Application Priority Data

Feb. 13, 1988 [DE] Fed. Rep. of Germany ....... 3804509

[51] Int. Cl.⁵ .............................................. C01B 15/12
[52] U.S. Cl. .................................. 423/279; 423/281; 23/313 FB; 23/313 R
[58] Field of Search .................. 423/281, 279; 252/186.28, 186.3, 186.38; 23/313 R, 313 FB

[56] References Cited

U.S. PATENT DOCUMENTS

| | | | |
|---|---|---|---|
| 2,900,668 | 8/1959 | Hübner et al. | 423/281 |
| 2,979,464 | 4/1961 | Pistor et al. | 23/313 R |
| 3,555,696 | 1/1971 | Pistor et al. | 34/9 |
| 3,914,380 | 10/1975 | Dillenburg et al. | 423/279 |
| 4,002,434 | 1/1977 | Simmersbach et al. | 423/281 |
| 4,115,519 | 9/1978 | Brichard et al. | 423/281 |
| 4,185,960 | 1/1980 | Brichard et al. | 423/281 |
| 4,215,097 | 7/1980 | Brichard et al. | 423/279 |
| 4,681,748 | 7/1987 | Doetsch et al. | 423/281 |
| 4,968,500 | 11/1990 | Bertsch-Frank et al. | 423/281 |

FOREIGN PATENT DOCUMENTS

1377162 12/1974 United Kingdom ............... 423/281

*Primary Examiner*—Michael Lewis
*Assistant Examiner*—Ngoc-Yen M. Nguyen
*Attorney, Agent, or Firm*—Beveridge, DeGrandi & Weilacher

[57] ABSTRACT

The spray drying of a solution containing hydrogen peroxide and sodium metaborate to obtain primary particles which are immediately conveyed after leaving the drying zone to a granulating device and are then granulated in the presence of free and/or perborate water of crystallization. The granulated materials are dried, if necessary. The generally amorphous primary particles are converted into granulated materials with at least partially crystalline structure and significantly improved shelf life. The work is performed with advantage in a spray dryer with integrated fluid bed or in a compressing granulating device. The method is suitable for preparing perborate granulated materials with an active oxygen content of over 10% by weight, especially perborate monohydrate granular materials with 14 to 16% by weight active oxygen. A rapidly dissolving product is produced with an acceptable apparent weight for ease in packaging.

17 Claims, 2 Drawing Sheets

HIGH ACTIVE OXYGEN CONTENT GRANULATED SODIUM PERBORATE PRODUCT AND METHOD OF MAKING THE SAME

RELATED APPLICATION DATA

This application is a continuation-in-part of U.S. patent application Ser. No. 07/355,845, filed May 17, 1989, now U.S. Pat. No. 4,968,500, which is a continuation of Ser. No. 07/202,363 filed June 6, 1988, now abandoned, which applications are relied on and incorporated herein by reference.

INTRODUCTION AND BACKGROUND

The present invention relates to a granulated sodium perborate product with an active oxygen content over 10% by weight. More particularly, the present invention relates to sodium perborate monohydrate granulated materials with an active oxygen content of approximately 14 to 16% by weight, made by means of spraying an aqueous solution containing hydrogen peroxide and sodium metaborate in a spray dryer and immediately thereafter granulating the primary particles obtained from the spray dryer.

Sodium perborate, a known material, is used both in the form of the so-called tetrahydrate and in the form of the so-called monohydrate in detergent, bleaching and cleaning agents. As used herein, the term "sodium perborates" denotes products with the typical 6-membered ring structure represented by the formula:

When $x=0$, the compound is sodium perborate monohydrate; when $x=4$, the compound is sodium perborate trihydrate and when $x=6$, the compound is sodium perborate tetrahydrate. The designations for the various perborates employed above and also in the following description do not correspond to the scientific nomenclature, but they are common forms in the art.

In addition to the active oxygen content, the exterior form, the nature of the surface, the grain size distribution, the bulk density, the shelf life, and the rate of dissolution play an important part for the selection of a perborate for a specific application, e.g. as sole bleaching agent or in combination with activators or peroxycarboxylic acids. Accordingly, many methods are directed toward influencing these parameters by means of the method of preparation.

Prior art detergent materials have used sodium perborate tetrahydrate formulations almost exclusively. Typical commercially available sodium perborate tetrahydrates products ($x=6$ in the formula above) have the following physical and chemical properties:

Appearance—White, odorless, freely flowing salt
Active Oxygen Content (Oa)—10.0%–10.4%, determined by titration with potassium permanganate in sulfuric acid.
Dissolution Rate (2g/l, 15° C.)—6–8 minutes
Apparent Density—0.7–0.8 kg/l
(bulk density of bulk weight)
Characteristics—Tends to agglomeration; over 40° C.
Melting point of technical product—approximately 60° C.

Sodium perborate tetrahydrate is normally prepared by reacting hydrogen peroxide with sodium metaborate in aqueous solution followed by crystallization. The active oxygen content of the tetrahydrate products approaches the theoretical maximum of 10.4% for the tetrahydrate product. Sodium perborates with an available oxygen content ($O_a$) of over 10.4% by weight, especially sodium perborate monohydrate with an $O_a$ content of approximately 15 to 16% by weight, are obtained either by the dehydration of perborate tetrahydrate or by drying a finely distributed aqueous solution containing hydrogen peroxide and sodium metaborate. Monohydrates with at least 15% active oxygen content are available, which is approaching the theoretical maximum value of 16% for the monohydrate product. In principle, sodium perborate monohydrates can be employed for the same purposes as the tetrahydrate products. The monohydrate product is even more versatile because of its higher active oxygen content and non-caking tendency.

The preparation of sodium perborate monohydrate by means of dehydration of sodium perborate tetrahydrate is practiced on an industrial scale, but this process is expensive because two stages are required, namely, the preparation and isolation of the tetrahydrate and its dehydration. The dehydration conditions must be adapted to the desired properties of the perborate monohydrate, whereby the energy efficiency and/or the space-time yield are unsatisfactory. Commercially available sodium perborate monohydrate manufactured in this manner usually has an $O_a$—content of 15–16%, an apparent density of 550 g/l and a dissolution rate of less than 1 minute (2 g/l, 15° C.).

The attempt has therefore already been made to obtain sodium perborate with an available oxygen content over 10.4% by weight directly, that is, without first preparing the perborate tetrahydrate.

DE-AS 17 92 273 teaches a method for the preparation of alkali perborates, especially of products low in water of crystallization with correspondingly high active oxygen contents, by reacting suitable alkali compounds with a carrier for active oxygen and spray drying, whereby the active oxygen carrier is added to the spray batch immediately prior to the atomization. An aqueous solution containing hydrogen peroxide and sodium metaborate is preferably sprayed and dried. Products prepared according to this method with an $O_a$ content around 15% by weight are generally in a very finely powdered form. Consequently, their use in detergents is problematical due to the unavoidable formation of dust. The material parameters no longer satisfy the requirements being placed on perborates today.

The method of DE-OS 35 05 158 is based on the same principle, namely, the spray drying of a solution or suspension containing $H_2O_2$ and sodium metaborate. The concentration of borate, calculated as $B_2O_3$, in the spray batch is limited to 90–130 g/l and the molar ratio of $H_2O_2$ to $B_2O_3$ is 2.0:1 to 4.2:1. A sodium perborate with an active oxygen content of over 16% by weight is obtained at an outlet air temperature in the spray dryer at 55° to 120° C., preferably 60° to 95° C.

The particle size distribution is particularly in a range of 10 to 20 micrometers; furthermore, the particles are amorphous; the bulk weight is in a range of 0.2 to 0.4 g/ml. As was the case in the older methods practiced in the past, the fineness of the product hampers its applicability for many purposes. In particular, the rate of dissolution is considerably reduced in comparison to the perborate monohydrate; the particles remain suspended in water or even collect on the surface. These are properties which raise a question as to trouble-free use as bleaching agents in detergents.

DE-PS 26 50 225 teaches a method of preparing granulated sodium perborate monohydrate wherein a 5 to 75% by weight aqueous solution containing hydrogen peroxide and a 5 to 40% by weight aqueous solution containing sodium metaborate are sprayed into a fluid-bed drier containing nuclei at a fluid-bed temperature of up to 100° C., and the water is evaporated with the swirling gas. In this method, the product generated in the fluid bed must be sieved, even mechanically comminuted, if necessary, and the perborate monohydrate with dimensions smaller than that which to be prepared is recycled. The high expenditure of energy, the unfavorable particle size distribution obtained at first, which requires a comminution, as well as the constant recycling of nuclei are considered disadvantageous.

If very fine perborates, produced e.g. according to DE-AS 17 92 273 or DE OS 35 05 158, are used as a starting point, granulation methods for building up more coarse products which can be used in detergents can be considered. However, success can not be predicted, especially in the granulation of perborates. Thus, perborate tetrahydrate with a particle size of 0.05 to 0.3 mm was granulated by means of mechanical action of the particles on each other in the presence of adhering water and optional binders in DE-PS 10 37 432. However, a heat treatment had to follow and preferably binders with an "explosive" action had to be used in order to disadvantageously affect the rate of dissolution by the granulation. This patent also points out the possibility of using other perborate hydrates. Nevertheless, examples or even suggestions are not given as to how one can convert sodium perborate monohydrate with an average particle diameter of approximately 5 to approximately 50 micrometers in an industrially simple manner into granulated materials with satisfactory abrasion resistance and a high rate of dissolution.

U.S. Pat. No. 4,002,434 shows treatment of sodium perborate monohydrate wherein the sodium perborate monohydrate is moistened with water or aqueous solutions at 20°–90° C. and dried in a fluid-bed drier, a device customary for granulations. This method does improve the abrasion; however, this patent contains no description of granulation occurring at the same time.

DE-PS 26 52 488 teaches a method of preparing granular materials from zeolites and oxygen-releasing compounds. Sodium peroxoborate is also mentioned; however, it is used as a moist product obtained from the centrifuge. This document yields no suggestions about the preparation of spray-dried, amorphous perborates and their granulation. Moreover, the products according to DE-PS 26 52 488 limit the usage of the peroxoborate contained in them.

Due to the unsatisfactory properties of the sodium perborates available by spray drying, as well as due to the problems to be expected with a separate granulation of very fine particles which are first isolated, it was not obvious to combine these method steps with one another in expectation of obtaining granulated sodium perborate which can be used with success in detergents and bleaching agents.

SUMMARY OF THE INVENTION

The present invention has the object of creating a granulated sodium perborate with an $O_a$ content over 10% by weight. The method for preparing products in accordance with the invention comprises a direct preparation of primary particles by spray-drying an aqueous solution. This method is intended to permit the production of granulated materials with a high active oxygen content which exhibit a good shelf life and are effective as bleaching agents, as well as permit a reliable adjustment of the bulk weight, the particle size distribution and rate of dissolution of the granular materials. The active oxygen content is responsible for the bleaching effect; therefore, the monohydrate product is of particular interest because of its high active oxygen content.

It is an object of this invention to produce a granulated sodium perborate product with an active oxygen content of over 10% by weight. Even more preferably, an active oxygen content of 14 to 16% by weight is preferred. An active oxygen content of 15 to 16% is especially preferred. The enhanced active oxygen content enables production of a lightweight final detergent product.

It is a further objective of this invention to provide a sodium perborate detergent and cleaning agent with a rapid rate of dissolution. For detergents and cleaning agents, it is important how fast a very active bleach added as a powder is dissolved in the aqueous phase. At very low dissolution rates, solid particles remain for longer periods in the washing bath and may be deposited in solid form on the items being washed. The solid particles may remain suspended in the water, or collect at the surface of the water. When dyed items are being washed, specks of fading and/or fiber damage can occur because of an excess local concentration of the active bleaching component, when the item being washed comes into contact with the suspended solids.

A great advantage of sodium perborate monohydrate over the tetrahydrate is a considerably higher dissolution rate. The time it takes to dissolve 2 g/l sodium perborate tetrahydrate at 15° C. is about 6–8 minutes; the dissolution rate of sodium perborate monohydrate is in the range of less than one minute to a few seconds. This illustrates why a sodium perborate produced according to the invention (melting granulation) should have not only as high an active oxygen content as possible, but also a high dissolution rate.

This high rate of dissolution leads to immediate formation of active oxygen (respectively $H_2O_2$) in the washing liquor. If perborate activators are used together with sodium perborate monohydrate, rapid "in situ" formation of organic peracids is possible. The low temperature bleaching performance (below 60° C.) is enhanced.

It is a further objective of this invention to provide a granulated sodium perborate product with a high apparent weight. The apparent weight of the product determines the volume of the finished cleaning agent and the corresponding package size needed per unit weight. In addition, detergent components with very different apparent weights can cause problems with regard to dissociation. In view of the desire to save packing material as well as storage space, the detergent industry is increasingly interested in generating detergents with a high apparent weight, preferably over 600 g/l. The products of this invention may be produced such that the apparent weight (or bulk weight) is over 600 g/l. In lower bulk weight products, there is a decreased tendency for separation of the compounds.

Other advantages of the monohydrate include higher resistance to increased temperatures, improved compatibility with other formulation components, and the ability to pick up moisture by forming the tetrahydrate. The ability to pick up moisture improves the stability of detergent products with increased moisture content or of products stored at high temperatures.

The product of the invention may be produced by means of a continuous method for the preparation of sodium perborate granulated materials with an $O_a$ content over 10% by weight, by the method of spraying an aqueous solution containing hydrogen peroxide and sodium metaborate, and drying the sprayed droplets by means of a heated gas. In carrying out this method, the primary particles are conveyed immediately after having left the drying zone of the spray dryer to a granulating device. There, in the granulating device, the primary particles are granulated in the presence of free and/or perborate water of crystallization and the resulting granulated materials are dried, if necessary.

In the present invention, the primary particles, which term designates the basically solid particles obtained by spray-drying, are supplied immediately after having left the drying zone of the spray dryer to the granulating device. This measure makes it possible to obtain granulated materials with the desired properties without isolation of the primary particles being necessary. A considerable advantage of the method resides in the fact that there are no problems with dust resulting from the very fine product formed at first.

The term "immediately" signifies that the primary particles leaving the drying zone of the spray dryer are supplied to the granulating device without appreciable cooling and without intermediate storage. This method of operation is advantageous regarding energy savings, and it creates favorable conditions for the granulation.

The primary particles formed in the spray dryer, which particles are generally amorphous at first, are surprisingly converted by means of the granulation into at least partially crystallized granulated materials. The degree of crystallinity is determined both by the reaction conditions of the method, such as temperature and dwell time, and also by the amount and in what manner the required water is added. A determination of the degree of crystallinity can be made in a known manner by measuring the distribution of intensity of X-ray diffraction patterns of powders. In addition, the granulation also significantly increases the shelf life of the product during storage in a warm, moist atmosphere. Thus, the granulation not only builds up larger particles, but at the same time, the properties of the perborate are considerably changed, rendering it suitable for practicable use in detergents and cleaning agents.

A spray-dried perborate monohydrate prepared according to DE-PS 17 92 273 with an active oxygen content of 15% by weight loses up to 10% (relative) of its active oxygen content after only a few days. In contrast thereto, sodium perborate monohydrate granulated materials in accordance with this invention generally lose less than 5% (relative) of their initial active oxygen content under the same storage conditions within 6 weeks of storage.

The diameter of the spray-dried primary particles is usually in a range of approximately 5 to 50 micrometers. The particle size and particle distribution of the granulated materials can vary within wide limits. Important influencing factors in that respect are the moisture content of the system, the temperature, the dwell time in the granulating device, the compression action of the granulating device, as well as the type and amount of any auxiliary granulating agents present. In general, the granulation is performed in such a manner that the dust portion (under 0.1 mm) and the coarse portion (greater than 0.8 mm) are each under 5% by weight, preferably under 2% by weight, of the granulated material. A person of ordinary skill in the art can readily determine the advantageous granulation conditions by means of preliminary tests. Of course, the dust portion can be returned after separation from the granulated material into the granulating stage and the coarse portion can also be utilized.

The bulk density of the granulated material is a function not only of the particle size distribution, but also of the compression during granulation. When a low-compression granulating device is used, which includes a granulation in a fluidized bed, a granular material with a rather low bulk density is obtained, e.g. a density in the range of 0.3 to 0.6 g/ml. If a granulating device with a greater compression is used, e.g. a continuously operating mixer or a drum with revolving scoops or screws, bulk densities of generally 0.4 to 1.0 g/ml are obtained.

The granulation of the primary particles is performed in the presence of free water and/or perborate water of crystallization. The free water can be supplied to the system by means of spraying water into the system with fine spray jets directed onto the material in the granulating device. It is also advantageous to spray the primary particles with water within, or alternatively, immediately after they leave the drying zone of the spray dryer. The water to be sprayed can also contain customary auxiliary granulating agents and/or hydrogen peroxide, boric acid or a sodium-boron compound as are known in the art. Particularly suitable auxiliary granulating agents are aqueous solutions containing water glass, alkali borates and alkali perborates, magnesium sulfate, sodium hexamethaphosphate, organic polymers such as starch, agar, xanthane, carboxymethylcellulose, polyacrylates, polyvinyl alcohol or mixtures of such substances. One of ordinary skill in this art can determine the amount of water necessary for spraying, the direction and number of spray jets, and the amount of auxiliary granulating agents to be used therewith by means of orienting tests in the device provided for spray-drying and granulating. If desired, the water to be sprayed for granulation can also contain active oxygen stabilizers such as chelate complexing agents containing amino and carboxyl groups or amino and phosphonate groups, and the water can contain surface-active substances, especially non ionic tensides (surface active agents) such as alkylbenzene polyglycol ether, as well as bleaching activators capable of forming peroxycarboxylic acid.

Instead of spraying the primary particles with water or an aqueous solution, it is also possible to make the moisture available by introducing a gas containing water vapor, preferably in the form of moist, heated air. The spray and the supplying of moist air can also be combined with one another. It is advantageous to use part of the drying air leaving the spray dryer with an average temperature of approximately 50° to approximately 100° C., preferably approximately 60° to 90° C., as the moist, heated air, which can be further moistened, if necessary.

As has already been described, the granulation can also be performed in the presence of perborate water of crystallization. In this manner, perborates containing water of crystallization in accordance with the initially indicated formula are present with x greater than zero, preferably 4 to 6. Such perborates can result from not completely dried, sprayed material in the form of primary particles.

Alternatively, or in addition to, finely distributed sodium perborate tetrahydrate or a melt thereof which is brought into the granulating zone, e.g. by being blown in, or by means of a screw, or by spraying, can also serve as a source of water. In this embodiment, the temperature of the material located in the granulating zone is preferably set at values at or just above the melting point of sodium perborate tetrahydrate, preferably approximately 60° to 75° C. The material leaving the drying zone of the spray dryer comes in intimate contact in the granulating zone with primary particles still containing water of crystallization and/or with added tetrahydrate. Melting processes occur hereby under the given temperature conditions, which makes the granulation possible, and a dewatering of any tetrahydrate present to the monohydrate also occurs as an option. Naturally, the composition of the granulate is a function both of the chemical composition of the primary particles leaving the drying zone of the spray dryer, and of the quantity ratio of primary particles to added tetrahydrate and/or water, as well as of the temperature and dwell time in the granulating device. The heat in the granulating zone is supplied by the primary particles and optionally by means of heated air, preferably air with a relative moisture content over 50%, and/or by means of contact heating. The intimate contacting of the material to be granulated with the moisture and/or with a perborate containing water of crystallization preferably occurs, as stated above, in a fluidized bed and/or a compressing granulating device.

The granulating of very fine sodium perborate monohydrate in the presence of, or by means of the addition of sodium perforate tetrahydrate, and obtaining of granulated material which exhibits an excellent particle size distribution and shelf life were not available until the products of the present invention were made.

If a so-called fluid bed with an impact flow bottom is used as granulating device, air is a suitable fluidizing gas. The temperature of the air is generally 60° to 130° C. and preferably 60° to 90° C. if sodium perborate monohydrate granulated material is to be produced. The fluid bed device is designed in a customary manner and is equipped by means of an overflow dam and a removal device for the granulated material for continuous operation. The outlet air may be removed together with or separately from that of the spray dryer and may be cleaned of dust by means of dust separators, such as cyclones.

If a fluid bed is used for granulating, the use of an auxiliary granulating agent is recommended, which auxiliary agent is sprayed as an aqueous solution onto the primary particles. Use of an effective amount; e.g., 0.1 to 10% by weight, preferably 0.5 to 3% by weight, in relation to the final product, of the binding agent, which is generally used as a 1 to 50% by weight aqueous solution, results in a sufficient action. Sodium perborate tetrahydrate as auxiliary granulating agent added in solid form is especially suitable when compressing granulating devices are used.

According to an advantageous embodiment of the method of the invention, a granulating device integrated directly into the spray dryer is used, e.g. a spray dryer with integrated fluid bed. In this way there is provided a spray drying zone and a separate granulation zone in one vessel.

The drying air of the spray dryer usually enters into spray dryer at 60° to 250° C., preferably 90° to 200° C. and in a particularly preferred manner at approximately 150° to 180° C. and leaves it at 50° to 200° C., preferably 50° to 100° C. and in a particularly preferred manner at 60° to 90° C.

Spray dryers with a customary design can be used, whereby the material to be sprayed and the drying air can be guided either in concurrent flow or in countercurrent flow. Considering the limited temperature stability of perborates, a concurrent flow guidance is preferable. Customary atomizing devices such as one-component jets or multi-component jets or centrifugal atomizers can be used to atomize the fluid material to be dried. Centrifugal atomizers are preferable. One skilled in the art can determine the operating conditions of the dryer, including temperature of the inlet and outlet air, air amount, feed amount, and jet parameters by means of orienting tests, whereby the composition and moisture content of the primary particles has a great influence on the immediately following granulation. The dwell time of the sprayed particles in the drying zone of the spray dryer is usually in the range of a few seconds to approximately 30 seconds. The still-warm primary particles are supplied in time and preferably also spatially immediately thereafter to the granulation. It is an advantage of the method of the invention that no nuclei of perborate or other seed material introduced into the spraying zone, and the granular material is obtained within the desired grain area in a simple manner in a high yield.

The aqueous solution to be sprayed contains hydrogen peroxide and sodium metaborate, as well as sodium perborate in equilibrium therewith. Customary available oxygen stabilizers and/or crystallization retarders such as sodium hexametaphosphate can also be present. These are matters well known in the art. Crystallization of sodium perborate prior to the spraying of the solution is not desirable. The solution is therefore generally prepared immediately prior to the spraying by bringing together an aqueous solution of hydrogen peroxide, preferably with a content of 30 to 85% by weight, and an aqueous solution or suspension of sodium metaborate with a content of 15 to 70% by weight, preferably 15 to 40% by weight.

Instead of sodium metaborate, another sodium borate or boric acid can also be used together with the appropriate amount of sodium hydroxide - the atomic ratio of Na:B should be approximately 1:1.

The molar ratio of hydrogen peroxide to sodium metaborate is preferably adjusted to 0.9 to 1.1, especially to 1.0 to 1.05, because this ratio results in perborates with an $O_a$—boron atomic ratio around 1, and thus also in sodium perborate granulated materials with $O_a$ values of approximately 10 to 16%, and especially sodium perborate monohydrate granular material with 14 to 16% by weight active oxygen.

The reaction enthalpy related during the preparation of the solution by bringing the reactants into contact with each other can preferably be used to reduce the energy requirements during drying. The concentration of the aqueous solution to be sprayed can be within broad limits, namely, from approximately 5 to approximately 50% by weight, calculated as $NaBO_2$. Concentrations in a range above approximately 40% by weight are less preferable on account of the high viscosity. Concentrations under 10% by weight are possible but the economy is reduced. A concentration between 15 and 25% by weight is especially preferable for the preparation of sodium perborate monohydrate granular materials.

The $O_a$ content of the perborate granular material is determined at a given molar ratio of $O_a$: boron in the spray solution by the conditions, especially temperature, moisture and dwell time, in the spray dryer and in the granulating device or zone and any optional downstream dryer or zone. A conversion of the active oxygen to evolvable oxygen can occur at a temperature of the primary particles over approximately 80° C., especially in the case of a relatively long dwell times.

The granulated materials, especially the sodium perborate monohydrate granulated materials in accordance with the invention, generally dissolve very rapidly. The rate of dissolution is somewhat retarded by using water glass as auxiliary granulating agent in relation to sodium perborate monohydrate obtained in a conventional manner by dehydration of the tetrahydrate. The abrasion of the monohydrate granulated materials obtained in accordance with the invention is within the range of the products on the market.

Another technical advantage of the method of the invention resides in the fact that sodium perborate granulated materials, preferably sodium perborate monohydrate granulated materials, can be prepared directly from readily accessible raw materials. The method is variable with regard to the parameters of the materials; these parameters can be readily adapted to the particular end product desired. The disadvantage of the insufficient shelf life of spray-dried sodium perborate monohydrate is able to be eliminated by means of the granulation in the presence of water which follows according to the invention directly after the spray drying.

The use of the monohydrate product is desirable in all cases where the products are intended for extended shelf life or storage in hot weather. Other applications of the monohydrate product include:

mouthwashes and dental care preparations, especially those buffered with acid additives; denture cleansers; quick dissolving preparations such as oxidants for hair dyes or cold permanent wave neutralizers; and hard surface cleaners, such as for plastic tableware.

DETAILED DESCRIPTION OF THE INVENTION

Sodium perborate monohydrate products made in accordance with this invention have the following properties:

available oxygen content of 14 to 16% by weight, especially 15 to 16% by weight;

rate of dissolution under 1 minute (determined by dissolving 1 g in 500 ml water (or 2 g/l) at 15° C. under agitation with a blade agitator at 330 to 340 rpms);

bulk weight above 0.6 to 1.0 $kg/dm^3$ (determined according to ISO test 3424); and free of foreign auxiliary agents. This particular combination of properties satisfies the market demand for heavy, rapidly dissolvable sodium perborate monohydrate products free of foreign material for use in washing-agent volume concentrates.

The products with a bulk weight of the range of 0.6 to 1.0 $kg/dm^3$ can be prepared if a rather high-compression granulating device is used, such as a continuously operating mixer or a drum with revolving blades or worms.

It has also been determined that the products in accordance with the invention also exhibit a low abrasion index. The abrasion index of these products according to ISO Test No. 5937, is not above 10%, thus avoiding dust formation during handling of the perborate granulate.

Sodium perborate tetrahydrates, available in the prior art, typically exhibit an apparent weight of 0.7 to 0.8 kg/l. However, the prior art tetrahydrate products, as described above, also exhibit an unacceptably slow dissolution rate.

The addition of foreign auxiliary ingredients is not necessary in order to achieve the above combination of properties for the monohydrate products. Effecting liquefication granulation requires only the presence of an effective quantity of a sodium perborate hydrate, such as sodium perborate tetrahydrate, which is capable of being liquefied under the manufacturing conditions. This obligatory ingredient can be added per se or formed by setting the moisture content at the beginning of granulation. Aqueous hydrogen peroxide can also be used to set the moisture, which makes it possible to increase the active oxygen content of the granulate by a few tenths of a percent if necessary. Foreign auxiliary ingredients are understood to include primarily surfactants (surface active auxiliary agents), such as those used by Brichard, U.S. Pat. Nos. 4,115,519, 4,185,960 and 4,215,097. The granulates according to the invention can be manufactured without foreign auxiliary ingredients; however, it is understood that compatible foreign auxiliary agents can optionally be used along with perborate in limited quantities (maximum of 2%). An example of a category of substances which can be included are stabilizers for active oxygen compounds, for example, chelate-forming phosphonates.

Various methods for producing products in accordance with the invention will now be explained in more detail in the following examples.

EXAMPLE 1

The apparatus consisted of a spray dryer with integrated fluid bed. The spray dryer, which was cylindrical in its upper part (diameter 1.6 m, height 1.0 m) and tapered down conically in its lower part, contained a centrifugal atomizer as well as the supply parts for the drying air centrally located on its upper cover; the outlet for the air was located peripherally on the upper part and followed by a cyclone. A cylindrical fluid bed device with impact flow bottom (area 3 $dm^2$), overflow dam and removal device was located directly under the conically tapered part of the spray dryer. A spray jet for spraying in water or an aqueous solution of auxiliary granulating agents was centrally located between the spray dryer zone and the fluid bed device. The apparatus also contained devices for heating and regulating the flow amount of the air for the spray dryer and the fluid bed.

The spray solution was prepared by mixing aqueous hydrogen peroxide (70% by weight $H_2O_2$) with aqueous $NaBO_2$ (19.1% by weight) and stabilized with $MgSO_4$. The $O_a$:B atomic ratio was 1.0, the concentration of the solution, calculated as $NaBO_2$, 16.7% by weight. The spray solution also contained 0.1% by weight $MgSO_4$ as stabilizer.

Operating conditions

Air inlet spray dryer—180° C.
  Air outlet spray dryer—76° C.
  Air inlet spray dryer—90° C.
  Air amount spray dryer—750 kg/hr.
  Air amount spray dryer—140 kg/hr.
  Feed amount to the spray dryer—45 kg/hr.
  Atomizer of the spray dryer—25,000 rpms
  Temperature of the fluid bed—66° C.

Spraying the primary particles with a 35% by weight aqueous solution of water glass ($SiO_2/Na_2O = 3.3$) in an amount of—1.7 kg/hr.

Production (total)—12.0 kg/hr.

EXAMPLE 1A

Material data of the products obtained:
Primary particles (from the cyclone)

| Particle size | |
|---|---|
| 32-63 micrometers | 36% |
| 20-32 micrometers | 34% |
| <20 micrometers | 30% |

Figure 1:
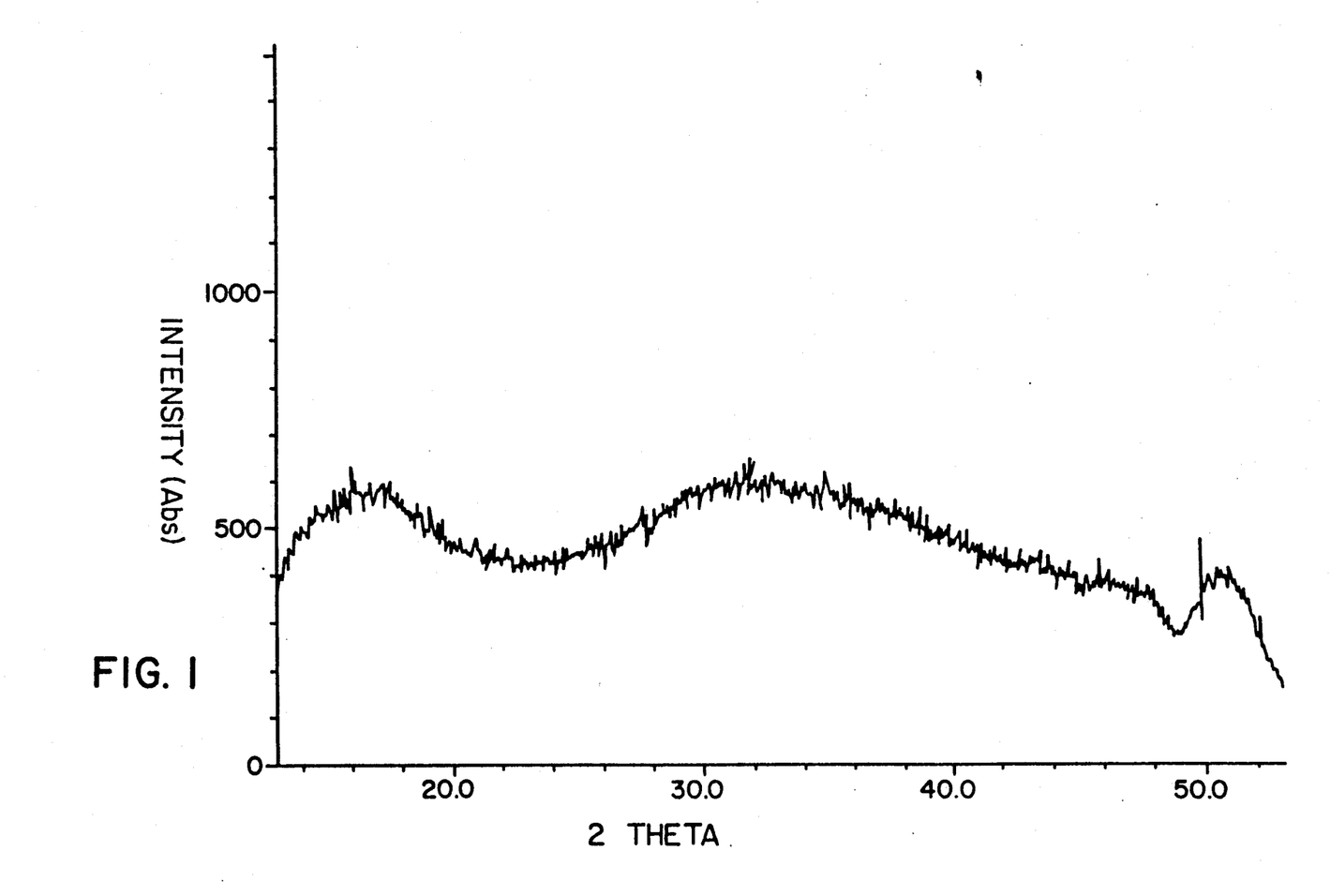
FIG. 1 is a plot of the diffractometer data of Example 1(a).

The primary particles contained an $O_a$ content of 15.6% by weight. The primary particles were essentially amorphous, cf. FIG. 1 of the diffractometer pattern with $CuK\alpha$ radiation range of 11° to 59° (2 theta).

EXAMPLE 1B

Granulated materials
Particle size—>0.8 mm 5.8% <0.1 mm 3.7%

| Bulk density | 480 g/l |
|---|---|
| $O_a$ content | 15.1% by weight |

Figure 2:
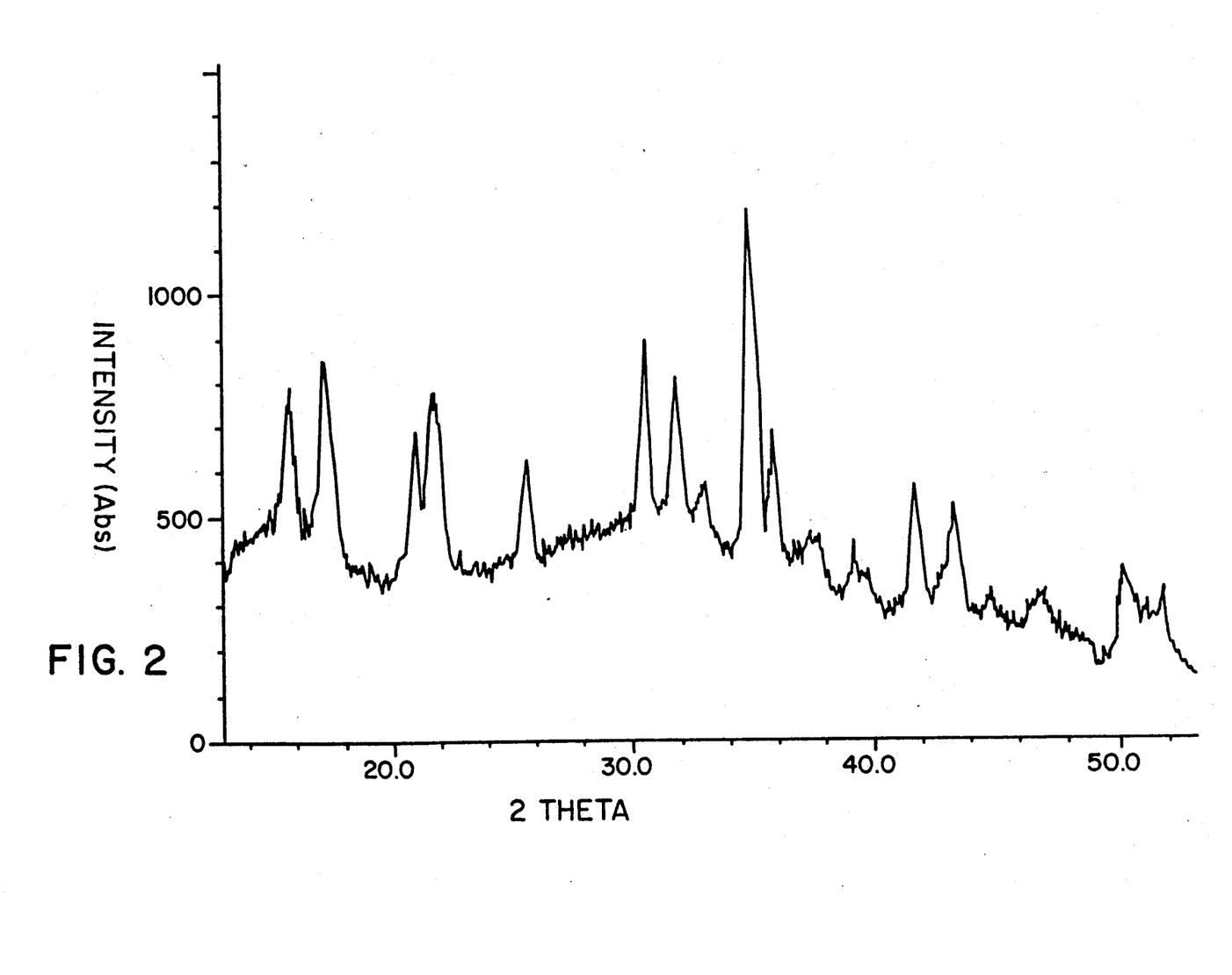
FIG. 2 is a plot of the diffractometer data of Example 1(b).

The granulated materials exhibited at least partially crystalline structure, cf. diffractometer pattern with $CuK\alpha$ radiation in a range of 11° to 59° (2 theta), see FIG. 2.

Shelf life: $O_a$ content (relative) when stored at 30° C. and 80% rel. air moisture

| | after 1 week | after 2 weeks | after 6 weeks |
|---|---|---|---|
| Primary particles* | 97.1 | 88.8 | 68.3 |
| Granular material** | 98.4 | 98.3 | 96.7 |
| By way of comparison: | | | |
| Sodium perborate monohydrate, $O_a$ 15.6%; Prepared by dehydration of sodium perborate tetrahydrate | 95.8 | 94.2 | 94.8 |

*according to EXAMPLE 1A
**according to EXAMPLE 1B

The monohydrate product can also retain approximately 15% active oxygen content by weight after one year, if stored in a cool, dry place.

EXAMPLE 2

An aqueous solution of the following composition was atomized in the spray dryer in the apparatus according to EXAMPLE 1: 14.3% by weight $NaBO_2$ and 7.3% by weight $H_2O_2$. The operating conditions correspond basically to those of EXAMPLE 1 except for:

Feed amount to the spray dryer—40 kg/hr.
  Air amount fluid bed—145 kg/hr.
  Inlet air to the fluid bed—100° C.
  Fluid bed temperature—65°

The primary particles were sprayed with 3 kg/hr. of an aqueous solution of the same composition as the solution supplied to the spray dryer. 9.2 kg/hr. granulated material is obtained.

$O_a$ content of the granulated material: 15.4% by weight.

The granulated material obtained exhibited only 2.1% by weight under 0.1 mm and 3.4% by weight over 0.8 mm. The rate of dissolution was 0.5 minutes (measured with 2 g/l at 15° C.), and the bulk density was approximately 490 g/l. $O_a$ decreases (relative) after 6 weeks of storage at 30° C. and 80% rel. air moisture was 4%.

The process described in Examples 1 and 2 above corresponds to the method claimed in allowed U.S. patent application Ser. No. 07/355,845.

Products with 14% to 16% by weight active oxygen content, a dissolution rate under one minute (for a 2% product concentration at 15° C.), and a bulk density over 600 g/l can be obtained by a melting granulation process.

Melting granulation results when sodium perborate monohydrate, which does not melt, is granulated in the presence of sodium perborate-tetrahydrate, which does melt. In order for granulation to occur, the mixture must be mixed and reach a temperature above the melting point of sodium perborate tetrahydrate, i.e., above approximately 60° C. in the case of the technical tetrahydrate. In this process, tetrahydrate particles will precipitate onto monohydrate particles and adhere to one another. During the melting, the molten tetrahydrate becomes strongly dehydrated. It is preferred that the temperature during the melting granulation process does not exceed 75° C., in order to enable granulation and prevent reduction in active oxygen content by decomposition of the peroxoborate. It is preferred that the temperature is in the range of 60° to 75° C., even more preferably, 65° to 75° C., with 70° to 75° C. especially preferred. If higher temperatures are used, dehydration may occur too rapidly, and thus the granulation may deterred.

EXAMPLE 3

The apparatus of a spray dryer and a cylindrical intensive mixer with vortex implement and radiation heating as well as a feed device for feeding powdery sodium perborate tetrahydrate into the mixer inlet.

A granulated mixture which was partially dehydrated during granulation is obtained by spray-drying a solution of primary sodium perborate particles according to EXAMPLE 1, dosing in an effective amount of solid, powdery sodium perborate tetrahydrate (finely distributed sodium perborate tetrahydrate)—1 part by weight per 3 parts by weight primary particles—and granulating at 72° C.:

| | |
|---|---|
| Available oxygen ($O_a$) | 14.9 by weight |
| Rate of dissolution<br>(2 g/l at 15° C., blade agitator<br>330 to 340 rpms) | <0.5 minutes |
| Bulk weight | 820 g/l |
| Size fraction < 0.1 mm | 9.7% |
| Size fraction > 0.8 mm | 12.1% |

The term "effective amount" of solid sodium perborate tetrahydrate is to be understood to mean, up to 50% by weight with reference to the product from the spray-drier. Preferably, 5 to 20% by weight, in particular 10-15% by weight of sodium perborate tetrahydrate is added, with, reference to sodium perborate primary particles. Primary particles having an $O_a$ content 14-16% by weight are preferably used.

The sodium perborate tetrahydrate may be added before, during or after the heating to 60° to 75° C.; however, it is preferred that it is added during or after the heating step. The tetrahydrate may be added continuously during the granulation or in batches.

EXAMPLE 4

Melting Granulation

Spray-dried sodium perborate monohydrate (sodium perborate primary particles) was removed from a spray drier with a temperature of approximately 65° C. and introduced into an intensive mixer. The intensive mixer is made up of a rotating cylindrical granulating drum with a side discharge, equipped with a star shaped mixer and a wall scraper. The mixer is heated by radiant energy. The spray-dried initial material exhibited a $d_{50}$ value in a range of 30 to 40 micrometers, the rate of dissolution was in the range between 10 and 50 seconds. The system was heated by radiant heating to 70° to 75° C., and after heating, a powdery sodium perborate tetrahydrate was introduced in via a gravimetric dosing apparatus. The tetrahydrate was added during the granulation step, and the granulation occurred under the conditions indicated in the Table which follows. After the granulation, to enhance product stability, the product is cooled in a fluid-bed cooler. If desired, before cooling, the product may be post-dried in a flow-bed drier at a fluid-bed temperature of 60° C. At least partial dehydration of the tetrahydrate will occur during post-drying. The grain size fraction of the product was subsequently determined (>0.2 mm and <0.8 mm). The granulate is quite flowable since it consists of rounded grains. The operating conditions and analysis results are shown in the following Table.

TABLE

| | Test Number | | | |
|---|---|---|---|---|
| | I | II | III | IV |
| $O_a$ content (% by weight<br>of the spray-dried<br>perborate monohydrate | 15.2 | 15.5 | 16.0 | 15.6 |
| Amount of perboratetra-<br>hydrate added (% relative<br>to monohydrate) | 10.0 | 13.3 | 15.0 | 13.3 |
| Granulation time (min.) | 3 | 3 | 3 | 3 |
| Granulate From The Intensive Mixer | | | | |
| $O_a$ content (%) | 14.7 | 14.9 | 15.2 | 15.0 |
| Bulk weight (kg/m³) | 918 | 968 | 967 | 875 |
| Dissolving time<br>(1 g/500 ml, 15° C.) (minutes) | <1 | 1.5 | 2 | 1.5 |
| Abrasion (ISO 5937) (%) | 2 | 6 | 6 | 6 |
| Post-dried Granulate | | | | |

TABLE-continued

| | Test Number | | | |
|---|---|---|---|---|
| | I | II | III | IV |
| $O_a$ content (%) | 15.2 | 15.4 | 15.8 | 15.5 |
| Bulk weight (kg/m³) | 886 | 922 | 916 | 834 |
| Dissolving Time (min.) | <1 | <1 | <1 | <1 |

It is to be noted that relatively short granulation times are preferred, to enhance the product stability.

Further modifications and variations of the foregoing invention will be apparent to a person skilled in the art and are intended to be encompassed by the appended claims.

We claim:

1. A granulated sodium perborate product, wherein said product includes an active oxygen content in the range of 14 to 16% by weight, a dissolution rate of less than one minute as measured for a 2% by weight product concentration at 15° C., a bulk weight over 600 g/l, and an abrasion index less than 10%, as measured by ISO Test 5937.

2. A granulated sodium perborate product according to claim 1, wherein the active oxygen content is 15 to 16% by weight.

3. A granulated sodium perborate product according to claim 1, wherein the bulk weight is greater than 800 g/l.

4. A granulated sodium perborate product according to claim 1, wherein said product is free from foreign auxiliary agents.

5. A granulated sodium perborate product according to claim 1, wherein the bulk weight is in the range of 600-1000 g/l.

6. A granulated sodium perborate product according to claim 1, wherein the rate of dissolution is less than one-half minute.

7. A method for producing granulated sodium perborate monohydrate with an active oxygen content of 14 to 16% by weight and a dissolution rate of less than 1 minute, measured with a 2% by weight solution at 15° C., comprising the steps of:
   removing spray-dried sodium perborate primary particles from a spray drier;
   introducing said perborate to an intensive mixing zone;
   heating said perborate to a temperature in the range of at least 60° C. to 75° C., and before, during or after said heating, adding an effective amount of powdery sodium perborate tetrahydrate under mixing condition, whereby said perborate tetrahydrate melts from said heating;
   allowing said perborate and said perborate tetrahydrate melt mixture to form the granulated sodium perborate; and
   post-drying said granulated sodium perborate.

8. The method according to claim 7, wherein the heating step is to a temperature in the range of 65° to 75° C.

9. The method according to claim 8, wherein said powdery sodium perborate tetrahydrate is introduced via a gravimetric feed apparatus.

10. The method according to claim 7, wherein the granulated product is cooled in a fluid-bed cooler.

11. The method according to claim 9, wherein the granulated product is post-dried in a flow-bed drier.

12. The method according to claim 11, wherein the flow-bed drier temperature is approximately 60° C.

13. The method according to claim 7, wherein the heating step is to a temperature in the range of 70° to 75° C.

14. The product made by the method of claim 7.

15. The method according to claim 7 wherein the granulated sodium perborate has a bulk density greater than 600 g/l.

16. A method for producing granulated sodium perborate monohydrate with an active oxygen content of 14 to 16% by weight and a dissolution rate of less than 1 minute, measured with a 2% by weight solution at 15° C., a bulk weight greater than 600 g/l and an abrasion index less than 10% based on ISO test 5937, comprising the steps of:

removing spray-dried sodium perborate monohydrate primary particles from a spray drier;

introducing said perborate monohydrate to an intensive mixing zone;

heating said perborate monohydrate to a temperature in the range of at least 60° C. to 75° C., and before, during or after said heating, adding 10 to 15% by weight sodium perborate tetrahydrate relative to the perborate monohydrate content, under mixing condition, whereby said perborate tetrahydrate melts from said heating;

allowing said perborate monohydrate and said perborate tetrahydrate melt mixture to form the granulated sodium perborate monohydrate; and post-drying said granulated sodium perborate monohydrate.

17. A granulated sodium perborate monohydrate with an active oxygen content of 14 to 16% by weight and a dissolution rate of less than 1 minute, measured with a 2% by weight solution at 15° C., a bulk weight greater than 600 g/l and an abrasion index less than 10% based on ISO test 5937, said granulated sodium perborate monohydrate produced by the process comprising the steps of:

removing spray-dried sodium perborate monohydrate primary particles from a spray drier;

introducing said perborate monohydrate to an intensive mixing zone;

heating said perborate monohydrate to a temperature in the range of at least 60° C. to 75° C., and before, during or after said heating, adding 10 to 15% by weight sodium perborate tetrahydrate relative to the perborate monohydrate content, under mixing condition, whereby said perborate tetrahydrate melts from said heating;

allowing said perborate monohydrate and said perborate tetrahydrate melt mixture to form the granulated sodium perborate monohydrate; and post-drying said granulated sodium perborate monohydrate.

* * * * *